2,354,267

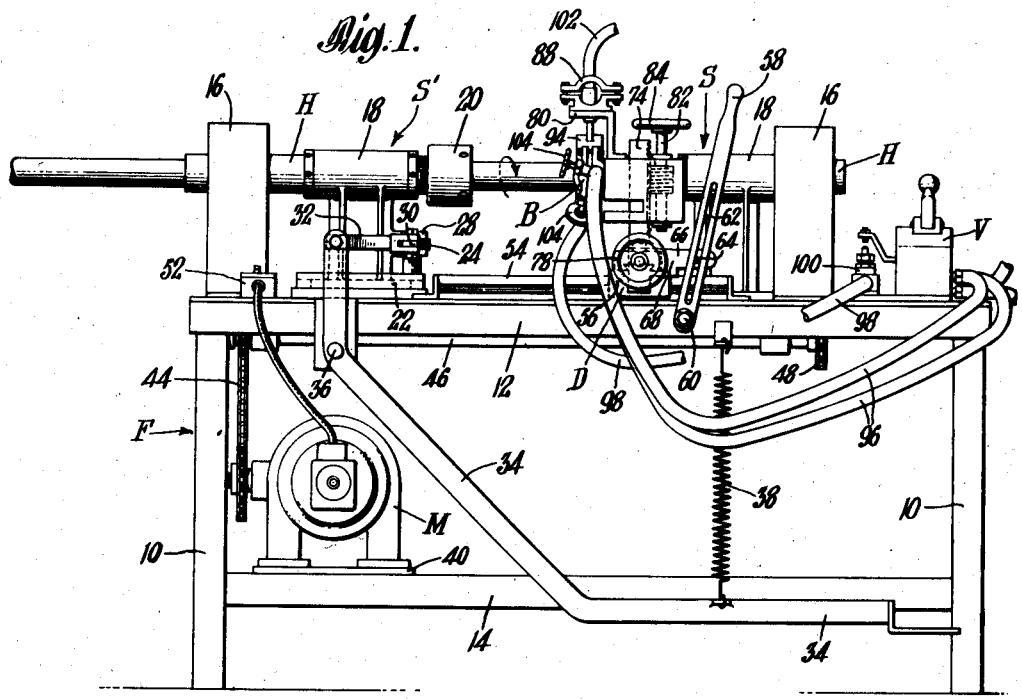

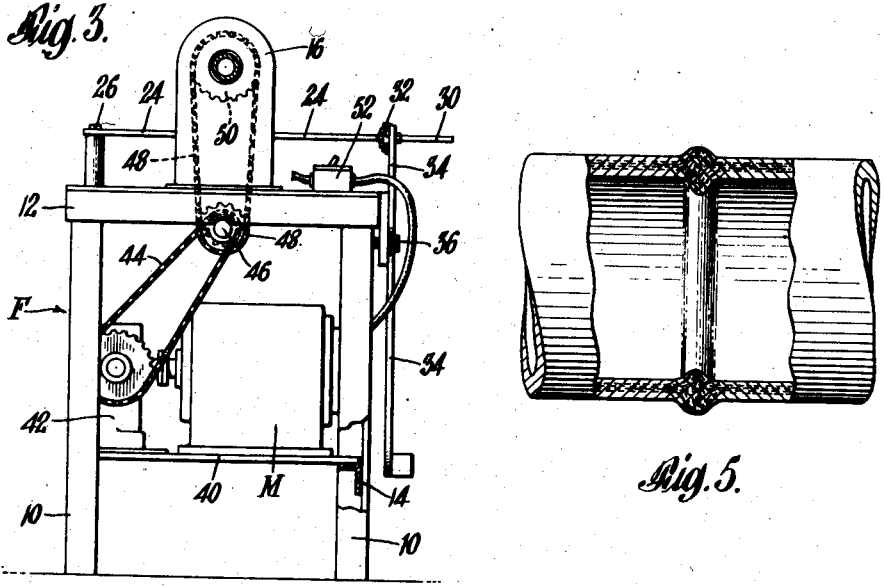
Fig. 3.
Fig. 5.
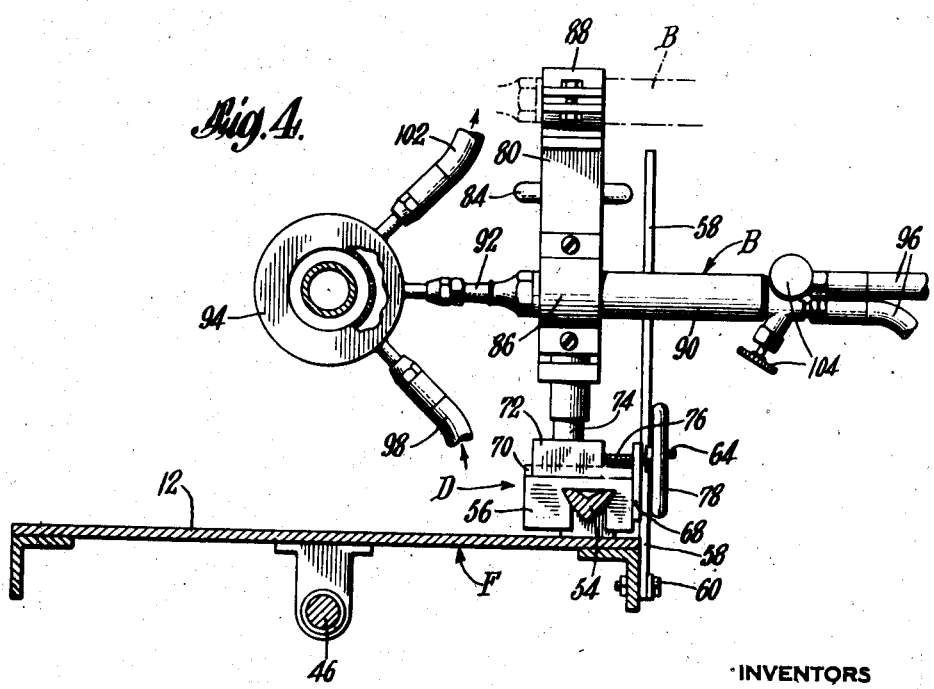
Fig. 4.
INVENTORS
ARTHUR R. LYTLE
WILLIAM MORTON
BY
ATTORNEY Patented July 25, 1944

UNITED STATES PATENT OFFICE 2,354,267

METHOD OF WELDING

Arthur R. Lytle and William Morton, Niagara Falls, N. Y., assignors to The Linde Air Products Company, a corporation of Ohio Application March 22, 1941, Serial No. 384,626

5 Claims. (Cl. 78—94)

This invention relates to welding and more particularly to a method of and apparatus for uniting metal members by a combined fusion and impact weld.

While the principles of the invention are applicable to many types of welding operations, they are particularly adaptable to the butt welding of cylindrical members, such as tubing, pipes, tank shells, etc. A particular application is the piecing or "safe ending" of boiler tubes to restore them to normal length after they have been removed from a boiler.

When a boiler is in service, the flues and tubes oxidize and pit rapidly due to impurities in the water used, as well as to certain other actions, such as contraction and expansion of metals when unequally heated. This scoring and pitting action is rapid in the bad water districts, and corrosion is most violent at the junction of the flues and tubes with the front and rear tube sheets of the boiler. As a result it is necessary occasionally to remove the flues and tubes from the boiler for cleaning and inspection. In some districts this has to be done as often as every eight months, while in other sections, where the feed water is purer, the tubes will last from eighteen months to three years without attention.

By cutting off the end that has been damaged by the removal operation and adding a new piece from eight to twelve inches long on one end, the flues or tubes can again be reassembled in the boiler and used for another period, when it is again necessary to repeat the same operation. This is known as "safe ending" and applies both to flues and superheater tubes, the new piece added being known as a "safe end."

In any case the old flues and tubes removed from boilers are tumbled or rattled for a number of hours inside a revolving drum after the ragged and damaged ends are removed by pipe cutter or pipe saw. This tumbling process tends to remove the scale that has accumulated on the exterior surface of the tube and adheres tightly thereto. In certain cases it is necessary to add hot water, steam or certain chemicals to the tumbling drum to assist in removal of the scale. The purpose of this cleaning process is to enable an adequate inspection to be made of the exterior surface of the tubes, particularly with respect to the extent of any corrosion or localized pitting that may have occurred. If the corrosion and pitting has not reduced the thickness of the tube to less than 75 per cent of the original thickness it is considered desirable to "safe end" the tubes for reinstallation in the boiler.

Until recent years it was the custom to apply "safe ends" by the so-called forge-welding process. This involved heating the ends of the old and new pieces in a gas or oil furnace, swaging down the end of the old flue, expanding the end of the new piece to be added, then forcing the new end over the old flue in the manner of a scarf joint, and welding the pieces together by means of a forge-welding process using a pneumatic hammer. The rejected or imperfect welds were an objectionable factor and sometimes ran as high as 30 per cent on flues welded by the furnace and forging process. Furthermore, the production was limited to a small number of flues per hour for two men.

During recent years there has been extensive use of a safe ending method utilizing automatically controlled electric resistance welding. In applying this process the flue and "safe ends" are clamped in the electrodes of an electric resistance pipe welding machine, a heavy electric current is passed through the abutting edges of the work and pressure is applied to form a resistance weld. The pressure is applied when the abutting edges are heated up to the fusion point and the result of the mechanical pressure is to cause a slight upsetting or fin at the point of the weld. This fin is reduced by transferring the safe ended tube, while the joint is still red hot, to a mandrel roller in which three rollers are applied externally to the heated joint with the mandrel in the interior. The mandrel roller rolls down the fin to a smooth surface on both the inside and outside surfaces of the tubes.

Although the type of joint formed by electrical resistance welding is satisfactory in quality, this process of welding is inherently expensive, both in the initial cost of installation of the necessary apparatus, such as transformers, switches, etc., and in operating cost. Also, great care in the preparation of the tube surfaces is required to secure good electrical contact to prevent hot spots and burning of the metal. As one example, a not unduly large electrical resistance welding installation capable of delivering a current of 10,000 amperes costs in the neighborhood of $15,000. Furthermore, as the electrodes of the resistance welders often must be renewed after 20 or 30 operations and seldom remain operative beyond 100 operations, the maintenance expense of the resistance welder is relatively large. Another factor mitigating the economy of welding by this process is the large and sudden instantaneous power demand of these installations, which results in relatively high charges for supplied power.

In view of the above factors, a satisfactory process of weld uniting these tube sections which is low in initial cost, inexpensive in upkeep and economical to operate has long been sought. Despite the economies of the situation, other processes of weld uniting these tubes generally have not been adapted due to inability to control the quality of the welded joint.

It is therefore among the objects of this invention to provide an improved process of forming welded joints of consistently uniform quality between metallic members, which process is simple, rapid and economical. Another object of the invention is to provide an apparatus for carrying out this process, which apparatus is low in initial cost and inexpensive to maintain, and which is rapid and economical in operation.

These and other objects of the invention will in part be obvious and in part become apparent from the following description and the accompanying drawings, in which:

Fig. 1 is a longitudinal elevational view of an apparatus which may be used to practice the invention;

Fig. 2 is a top plan view of the apparatus shown in Fig. 1;

Fig. 3 is an end view looking from the left in Fig. 1;

Fig. 4 is a view on the line 4—4 of Fig. 2 looking in the direction of the arrows; and Fig. 5 is a longitudinal sectional view at the joint between two tubes weld united by the process of the invention.

Generally speaking, according to the present invention, the members to be welded are united by a combined impact or percussion and fusion weld. To produce a weld in which the joint between the members is a homogeneous admixture of metal, in the novel process of this invention the members are first placed in adjacent relation, and each of the opposed surfaces is heated to the fusion point. When a substantially uniform film of molten metal has been formed on each surface, the members are moved together, or impacted under slight pressure, thus producing a welded joint having desirable characteristics superior to those of joints formed by the methods used heretofore.

In the improved method of the present invention, metallic members having congruent circular end surfaces are arranged with such end surfaces in axial alignment and in slightly spaced relation. Heat is then applied to each of the end surfaces to fuse the same and form films of molten metal thereon. At the same time, the members are rotated in synchronism at a uniform angular velocity, sufficiently fast that the centrifugal force exerted on such films will equalize or overcome the force of gravity thereon. When substantially uniform films have been formed over each of said end surfaces, the end surfaces are moved together or impacted under slight pressure to form a welded joint therebetween. In the preliminary steps of the method, a heating means may be oscillated or reciprocated over the surfaces of the members for a short distance from the end surfaces to bring these portions of the members to a red heat, and as a final step a heating means may be oscillated or reciprocated over the welded joint to smooth the surfaces of the same.

To facilitate an understanding of the invention, one form of apparatus with which the novel welding process may be practiced has been illustrated in the accompanying drawings and will be described in some detail. It should be understood, however, that other suitable apparatus may be used to practice the process of the invention.

The illustrated apparatus may comprise a suitable frame F upon which are mounted fixed and movable supports S and S', respectively, for the members to be welded. Each support S, S' includes a rotatable member, such as a hollow spindle or mandrel H of suitable refractory material, for receiving one of the members to be welded, and an electric motor or other suitable source of motive power M is provided to rotate each of the mandrels H in synchronism at a uniform angular velocity. Suitable heating means may be operatively associated with the rotatable members H, and as shown may comprise a water cooled welding blowpipe B secured in a bracket D slidably and adjustably mounted on the frame F adjacent the fixed support S. The supply of gases to the welding blowpipe B may be controlled by a suitable means, such as a valve mechanism V similar to the type described and claimed in Lloyd W. Young Patent No. 2,187,581, issued January 16, 1940, or in the copending application of James H. Bucknam et al., Serial No. 188,468, filed February 3, 1938. This valve mechanism turns the several gases forming the combustible mixture on and off in a pre-selected sequence, and also controls the flow of cooling water through the blowpipe. Suitable means, described in more detail hereinafter, are provided for moving the movable support S' longitudinally of frame F to move the surfaces to be united into engagement, or to impact the surfaces, under slight pressure and for oscillating or reciprocating blowpipe B longitudinally of the frame F.

Referring more specifically to the drawings, the frame F includes vertical members 10 and upper and lower horizontal members 12 and 14, respectively. The supports S, S' are mounted on the member 12, and each support includes a driving mechanism housing 16 and a bearing member 18 for supporting the hollow mandrel H. Associated with each spindle or mandrel is a suitable means for retaining a tubular member therein. Such means may comprise a chuck 20, which, although shown as a hand operated member, may be of the self-centering pressure operated type now extensively used in the automotive industry. As the members to be welded, which are held in the hollow rotating mandrels H by the chucks 20, are heated to the fusion temperature, the mandrels desirably are made of a suitable refractory material. It will be noted that the support S is fixedly mounted on the frame F, while the support S' is slidably mounted on a suitable track 22 secured to the frame.

A horizontally extending lever 24 is pivotally connected at one end 26 to the member 12 and at an intermediate point 28 to the bearing 18 of the support S'. The other end of the lever is formed as a handle 30, and, adjacent the handle, an arm 32 is bolted to the lever. At its opposite end, arm 32 is pivotally connected to a bent, vertically extending lever 34, pivoted to frame F at 36, and forming a foot treadle. A spring 38, connected to the frame F, resiliently supports the longer arm of treadle 34.

The motor, or other primary driving mechanism M, is mounted on a platform 40 on the lower horizontal members 14. Connected to the motor is a gear reduction unit 42 which, through a chain drive 44, transmits power to a shaft 46.

Chain drives 48 on each end of shaft 46 connect the shaft to suitable gears 50 in the housing 16 of each support S or S', respectively, for the purpose of rotating the mandrels H in synchronism. Operation of the motor may be controlled by a suitable switch 52, mounted at a convenient point on frame F.

Adjacent the support S is a guiding track 54, extending longitudinally of frame F, on which is slidably mounted a block 56. The block 56 may be moved longitudinally of track 54 by means of a lever 58, pivoted at 60 to frame F and having a slot 62 in which is slidably engaged a pin 64 on an arm 66 comprising part of a vertical plate 68 secured to block 56.

The upper surface of block 56 is formed with a guiding track 70, extending at right angles to track 54, and slidably engaging track 70 is a block 72 supporting a vertical column 74. A threaded shaft 76, provided with a hand wheel 78, is secured against longitudinal movement in plate 68 and threadedly engages block 72 for adjusting this block along the track 70. A blowpipe support 80 is slidably mounted on column 74, and may be adjusted vertically of the column by means of a threaded shaft 82 operated by a hand wheel 84 and engaging a rack or other means on column 74. Suitable clamping brackets 86 and 88, secured to support 80, are adapted to receive the body 90 of the blowpipe B and support the same in either of two positions.

Mounted on the stem 92 of the blowpipe B is an annular heating head 94 having a plurality of radially inwardly directed flame projecting orifices in its inner periphery, and formed with passages to permit the circulation of cooling fluid therethrough. Gas conduits 96 connect the body 90 of the blowpipe with the respective gas valves of the valve mechanism V, and an inlet conduit 98 connects the passage in head 94 to a cooling fluid control valve 100 on the valve mechanism. Cooling fluid is exhausted from head 94 by means of a conduit 102. The heating head 94 is substantially axially aligned with the rotatable members H.

The valve mechanism V forms no part of the present invention and, as previously stated, is similar to those disclosed and claimed in the Young patent or Bucknam et al. application to which reference has previously been made. The valve mechanism is adapted to open and close the gas valves and the cooling fluid control valve in a preselected sequence. Usually the valve controlling the combustible gas, such as acetylene or hydrogen, is opened first and simultaneously with the valve controlling the cooling fluid, and then the valve controlling the combustion-supporting gas, such as oxygen, is opened. The several valves are closed in the reverse sequence.

In practicing the method of this invention, as applied to the butt welding of tubular members, the members to be weld united are each placed in one of the hollow mandrels, or spindles, H and secured therein by the chucks 20. The tubular members are so placed in the mandrels that their adjacent ends preferably are separated a slight distance to permit the flames from the heating head 94 to project between the ends. The heating head 94 is then adjusted horizontally and vertically until it is concentric with the members to be welded and with the hollow mandrels H.

When all the above parts have been properly positioned, switch 52 is closed and motor M rotates the mandrels H in synchronism at a substantially uniform angular velocity. The valve mechanism V is then actuated to initiate the flow of gases and cooling fluid to the heating head. The usual blowpipe valves 104 may have been adjusted previously to secure the desired flame characteristics.

When the blowpipe B has been lighted and the heating flames properly adjusted, the lever 58 is reciprocated, thus oscillating or reciprocating the heating flames back and forth over the rotating members to be welded, for a short distance either side of the adjacent ends of the members. When the end portions of the members have reached a red heat, the blowpipe is moved to a position wherein the heating flames are directed between and on the adjacent end faces of the members. The blowpipe is maintained in this position until a substantially uniform molten film has been formed on each end face. When this condition has been attained, treadle 34 or handle 30 is actuated to slide the bearing member 18 of support S' toward support S, moving the molten end faces together, or impacting the end faces, under slight pressure to weld unite the members. If desired, the blowpipe flames may be maintained on the joint for a short time to smooth the exterior periphery thereof. This is not absolutely necessary as suitable apparatus may be used to ream the tubes and grind off the excess metal on the outer surface.

The primary purpose of rotating the members during the heating operation is to prevent the molten film from running down the end faces of the members. The speed of rotation should be just sufficient that the centrifugal force acting upon the molten film will prevent this "running down," and not great enough to cause droplets of the metal film to be thrown off by centrifugal force. For instance, in a specific example, when welding two inch diameter tubes having a wall thickness of one-eighth inch, a speed of 50 to 60 R. P. M. has been found satisfactory.

The type of weld formed by this method is illustrated in Fig. 5, which shows the reinforcing bulge obtained when the members are impacted under slight pressure after the end faces have become molten.

While, for the purpose of illustration, the process has been described particularly as applied to the butt welding of tubes, it is not limited to this specific application, but one of the parts to be welded may be an elbow, a T or even a solid plate. Furthermore, although one form of apparatus has been described with some particularity, the process may be practiced equally well with other apparatus; and the heating of the members may be accomplished by means other than the oxy-gas flame, such as, for instance, electrical induction heating.

Although a specific application of the process of the invention and a specific form of apparatus for carrying out this application have been described, the invention may be otherwise practiced and embodied provided the objects of the invention are attained.

What is claimed is:

1. A process of weld uniting metallic members having congruent circular end surfaces, which comprises arranging said members with said end surfaces thereof in axial alignment and in adjacent relation, applying heat to each of said end surfaces to fuse the same and form films of molten metal thereon, rotating each of said members in synchronism at a substantially uniform angular velocity while said end surfaces are being heated to maintain the distribution of said films of molten metal substantially uniform over said end surfaces and to prevent substantial loss of molten metal, and thereafter moving said heated end surfaces together under pressure to form a welded joint therebetween.

2. A process of weld uniting metallic members having congruent circular end surfaces, which comprises arranging said members with said end surfaces thereof in substantially axial alignment and in adjacent relation, directing a high temperature heating flame upon each of said end surfaces to heat the same to the fusion point to form films of molten metal thereon, rotating said members in synchronism at a substantially uniform angular velocity while said end surfaces are being heated, the rate of rotation being sufficient to prevent loss of molten metal from the end surfaces and to maintain said films substantially uniform over said end surfaces, and thereafter impacting said heated end surfaces to form a welded joint therebetween.

3. A process of weld uniting metallic members having congruent circular end surfaces, which comprises arranging said members with said end surfaces thereof in substantially axial alignment and in adjacent relation, heating each of said members at and adjacent said end surfaces to a red heat, then heating each of said end surfaces to the fusion point to form thin films of molten metal thereon, simultaneously with said heating operations rotating each of said members in synchronism at a substantially uniform angular velocity to maintain said molten films substantially uniformly distributed over said end surfaces and to prevent substantial loss of molten metal, and thereafter moving said heated end surfaces together under pressure to form a welded joint therebetween.

4. A process of weld uniting metallic members having congruent circular end surfaces, which comprises arranging said members with said end surfaces thereof in substantially axial alignment and in adjacent relation, reciprocating a high temperature heating flame over each of said members along a path extending a short distance on each side of said end surfaces, then directing said high temperature heating flame on said end surfaces to heat the same to the fusion point to form films of molten metal thereon, simultaneously with said heating operations, rotating each of said members in synchronism at a substantially uniform angular velocity sufficient to maintain said molten films substantially uniform over said end surfaces and to prevent substantial loss of molten metal, and thereafter impacting said end surfaces to form a welded joint therebetween while continuing rotation of said members.

5. A process of weld uniting metallic members having congruent circular end surfaces, which comprises arranging said members with said end surfaces thereof in substantially axial alignment and in adjacent relation, directing a high temperature heating flame upon each of said end surfaces to heat the same to the fusion point to form films of molten metal thereon, simultaneously rotating each of said members in synchronism at a substantially uniform angular velocity sufficient to maintain said molten films substantially uniform over said end surfaces and to prevent substantial loss of molten metal under action of gravity, thereafter moving said heated end surfaces together under pressure to form a welded joint therebetween, and then reciprocating said high temperature heating flame over said welded joint to smooth the surface of the same.

ARTHUR R. LYTLE.
WILLIAM MORTON.